(12) United States Patent
Workman et al.

(10) Patent No.: US 7,891,373 B2
(45) Date of Patent: Feb. 22, 2011

(54) FLOW CONTROL VALVE

(75) Inventors: Jeffrey D. Workman, Moorcroft, WY (US); Larry L. Locke, Upton, WY (US); Jon B. Rose, Sandy, UT (US)

(73) Assignee: Flomeg, LLC, Sandy, UT (US)

( * ) Notice: Subject to any disclaimer, the term of this patent is extended or adjusted under 35 U.S.C. 154(b) by 458 days.

(21) Appl. No.: 12/009,724

(22) Filed: Jan. 22, 2008

(65) Prior Publication Data

US 2008/0178944 A1    Jul. 31, 2008

Related U.S. Application Data

(60) Provisional application No. 60/881,422, filed on Jan. 19, 2007.

(51) Int. Cl.
 *F16K 31/124* (2006.01)
(52) U.S. Cl. ............... 137/413; 137/412; 251/43
(58) Field of Classification Search ........... 137/413, 137/415, 429, 412, 592; 141/198; 251/33, 251/41, 43
 See application file for complete search history.

(56) References Cited

U.S. PATENT DOCUMENTS

| 1,788,827 A * | 1/1931 | Ferrin ............... 137/400 |
| 2,477,186 A | 7/1949 | Koehler |
| 2,528,499 A | 11/1950 | Davies |
| 3,062,230 A | 11/1962 | Becht |
| 3,625,264 A | 12/1971 | Swain |
| 3,929,155 A * | 12/1975 | Garretson ........... 137/430 |
| 4,064,907 A | 12/1977 | Billington et al. |
| 4,142,552 A | 3/1979 | Brown et al. |
| 4,305,422 A * | 12/1981 | Bannink ............. 137/415 |
| 4,830,042 A | 5/1989 | Cho |
| 5,282,496 A | 2/1994 | Kerger |
| 5,460,197 A | 10/1995 | Kerger et al. |
| 5,487,404 A | 1/1996 | Kerger |
| 5,842,500 A | 12/1998 | Rockwood et al. |
| 5,850,849 A | 12/1998 | Wood |
| 6,311,723 B1 * | 11/2001 | Shipp et al. ......... 137/413 |

FOREIGN PATENT DOCUMENTS

| EP | 0 144 549 | 6/1985 |
| GB | 1 153 381 | 5/1969 |
| GB | 1 193 007 | 5/1970 |
| GB | 1 335 188 | 10/1973 |
| GB | 1 440 107 | 6/1976 |
| GB | 1 541 110 | 2/1979 |
| GB | 2 317 382 | 3/1998 |

* cited by examiner

*Primary Examiner*—John Rivell
*Assistant Examiner*—Kevin Murphy
(74) *Attorney, Agent, or Firm*—Madson IP, P.C.

(57) ABSTRACT

Systems and apparatus for controlling the flow of fluid into a tank, such as a fuel tank on heavy equipment. An inlet valve includes a head portion for making connection with a nozzle, a receiver attached thereto and a piston which closes against a face in the head portion. A float valve includes a float and a valve which seals when a predetermined fluid level is reached. A bleed line is used to connect the receiver to the float valve. The unique design allows placement of the float valve at any desired height within the tank, and placement of the bleed line inside or outside of the tank as may be desired for the application.

22 Claims, 6 Drawing Sheets

FLOW CONTROL VALVE

CROSS-REFERENCE TO RELATED APPLICATION

This application claims the benefit of U.S. Provisional Application No. 60/881,422, filed Jan. 19, 2007, which is incorporated herein by reference in its entirety.

TECHNICAL FIELD

The present invention relates generally to systems and apparatus for protecting containers, such as fuel tanks on mobile equipment, against overfilling and over pressurization. More particularly, the present invention relates to flow control valve systems.

BACKGROUND

To rapidly fill containers, such as the fuel tanks on mobile equipment, liquids are pumped under pressure into the containers. Given the size of fuel tanks on heavy equipment, such as mining equipment, high pressures are used to reduce filling times. A supply hose, connected to the outlet of a pressure pump, is usually provided with a flow nozzle releasably connectable to a flow coupling on the container. The flow nozzles are usually provided with shut-off valves to stop the flow of liquid to the container when back pressure indicates that the container is full. However, operators often manually override these shut-off valves, since it is common for the shut-off valves to "trip" before a container is full. With large equipment, such as mining equipment, operators have manually overridden shut-off valves; pressure can build to the extent that fuel tanks bulge, and even rupture. Clearly, the damage to the tanks, and the loss of fuel, is unacceptable.

One attempt to address this issue resulted in the flow control valve assembly disclosed in U.S. Pat. No. 6,311,723 to Shipp et al. In use, the Shipp type of device was often installed directly in the side of a tank. The piston-containing chamber extended out into the tank and the sidewall ports disposed at a distal point along the axis thereof would act as opposite directional nozzles, resulting in turbulence in the tank, and often further resulting in premature shutoff. This design also utilized the sidewall of the piston to effect closure of the ports, often without a positive stop for the piston, other than the length of the spring. During motion of the equipment, the piston could be unseated. Additionally, the lever-style float valve was found to lack sufficient durability, due to fluid motion in the tank.

Clearly, there is a need for apparatus or systems that prevent overfilling while resolving some of the problems found in the prior art devices.

SUMMARY

The present invention includes systems and apparatus for controlling the flow of fluid into a tank, such as a fuel tank on heavy equipment. An inlet valve includes a head portion for making connection with a nozzle, a receiver attached thereto, and a piston which closes against a face in the head portion. A float valve includes a float and a valve which seals when a predetermined fluid level is reached. A bleed line is used to connect the receiver to the float valve. The unique design allows placement of the float valve at any desired height within the tank, and placement of the bleed line inside or outside of the tank as may be desired for the application.

DESCRIPTION OF THE DRAWINGS

It will be appreciated by those of ordinary skill in the art that the various drawings are for illustrative purposes only. The nature of the present invention, as well as other embodiments of the present invention, may be more clearly understood by reference to the following detailed description of the invention, to the appended claims, to the appendix attached hereto, and to the several drawings.

DETAILED DESCRIPTION

The present invention relates to apparatus and systems for protecting containers from overfilling and over-pressurization. It will be appreciated by those skilled in the art that the embodiments herein described, while illustrative, are not intended to so limit the invention or the scope of the appended claims. Those skilled in the art will also understand that various combinations or modifications of the embodiments presented herein can be made without departing from the scope of the invention. All such alternate embodiments are within the scope of the present invention. Similarly, while the drawings depict illustrative embodiments of the devices and components in accordance with the present invention and illustrate the principles upon which the device is based, they are only illustrative and any modification of the invented features presented here are to be considered within the scope of this invention.

Figure 1:
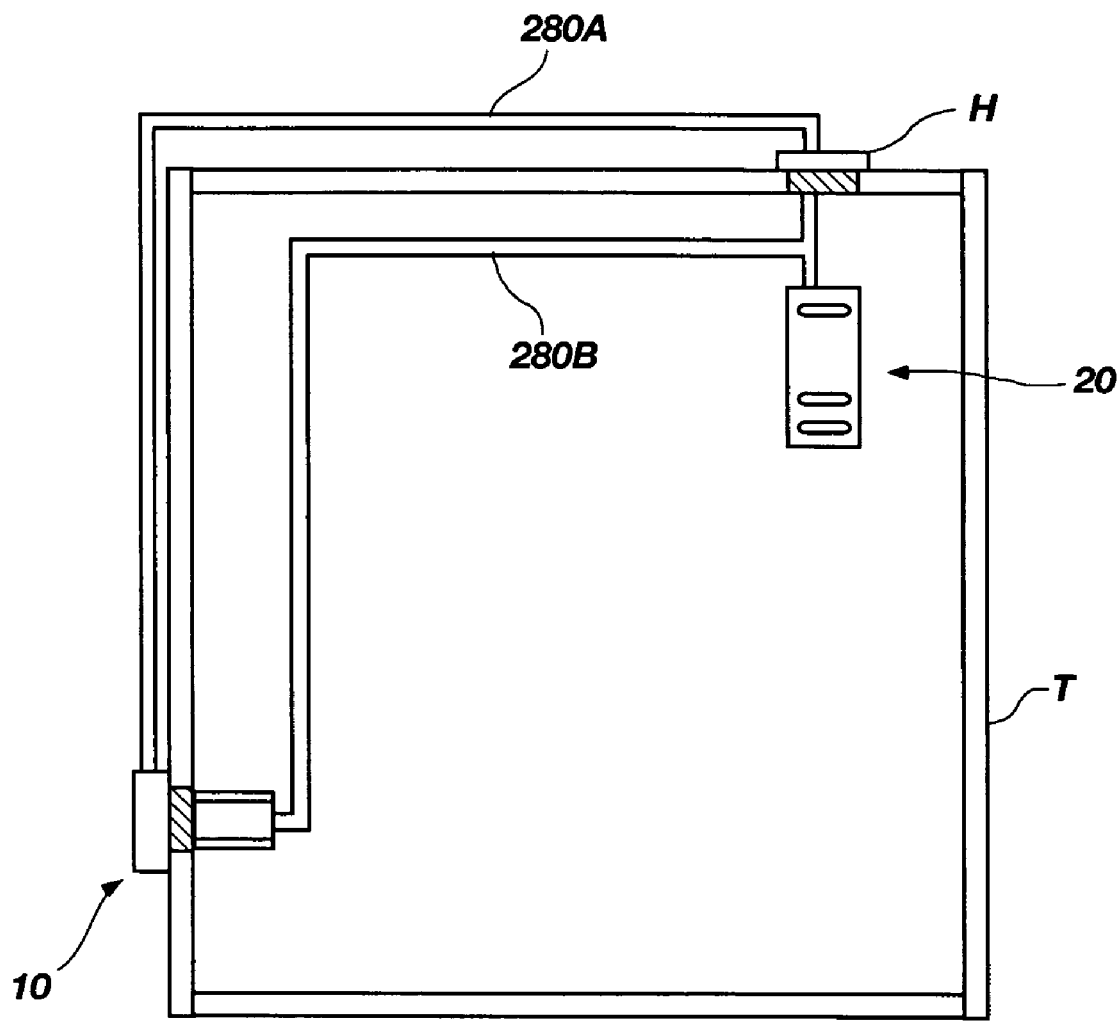
FIG. 1 is a schematic view of an illustrative embodiment of a flow control valve system in accordance with the present invention, including an inlet valve assembly and a float valve assembly.

FIG. 1 depicts a schematic view of an illustrative embodiment of a flow control valve system in accordance with the present invention, including an inlet valve assembly 10 and a float valve assembly 20 installed on a tank T, which may be a fuel tank on or for a piece of heavy machinery, such as mining or construction equipment. Inlet valve assembly 10 may be disposed directly in a wall of tank T, as depicted or may be disposed at the inlet of a feed tube for such a tank. Float valve assembly 20 may be disposed near an upper surface of the tank, situated at an appropriate depth to close the flow control valve system, as may be adjusted using mounting head H. Tubing 280 runs from float valve assembly 20 to inlet valve assembly 10, which may be internal to tank T as depicted by tubing 280B or external as depicted by tubing 280A, providing a fluid connection therebetween.

Figure 2:
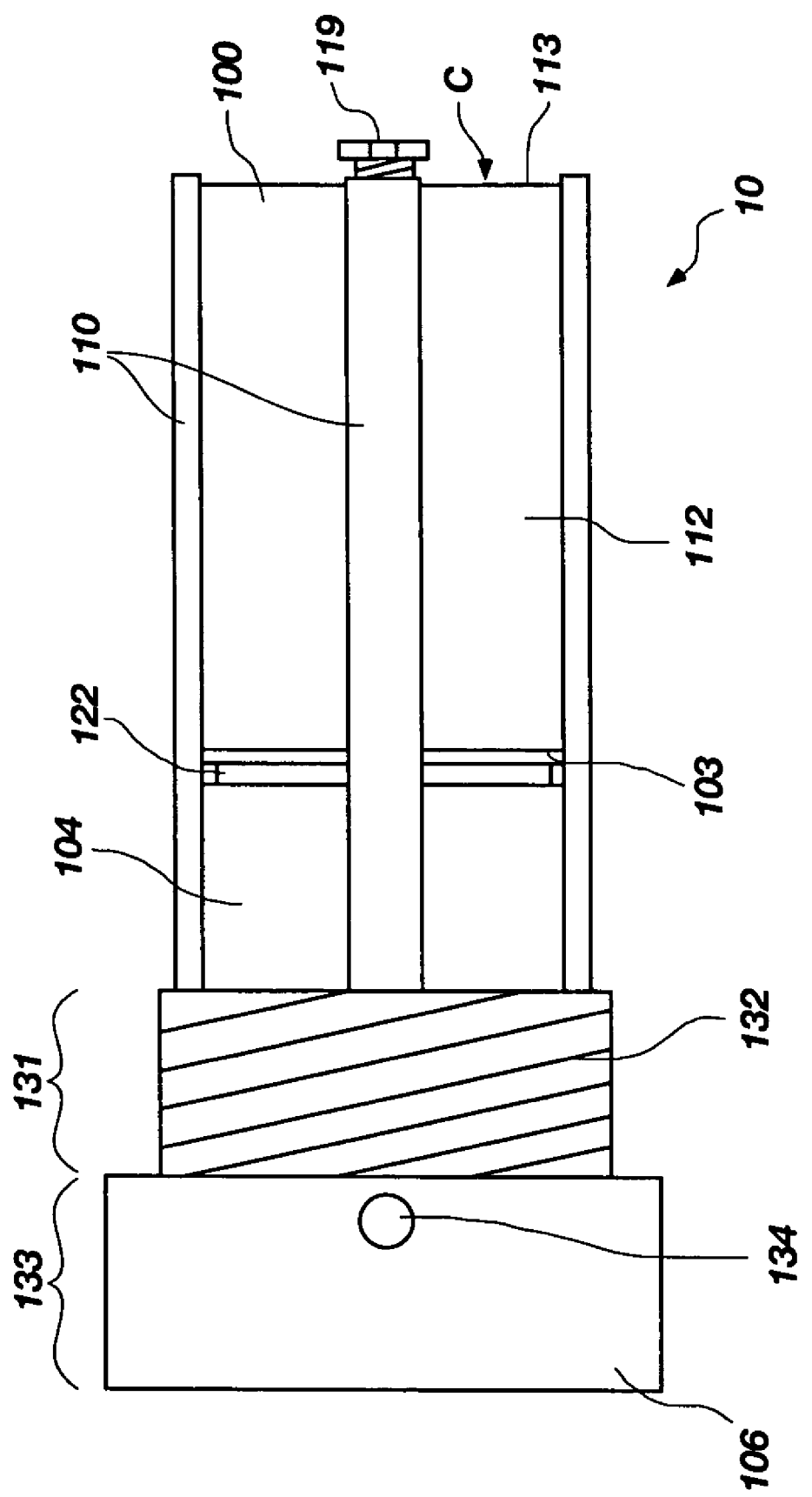
FIG. 2 is a top view of the inlet valve assembly of FIG. 1.
Figure 3:
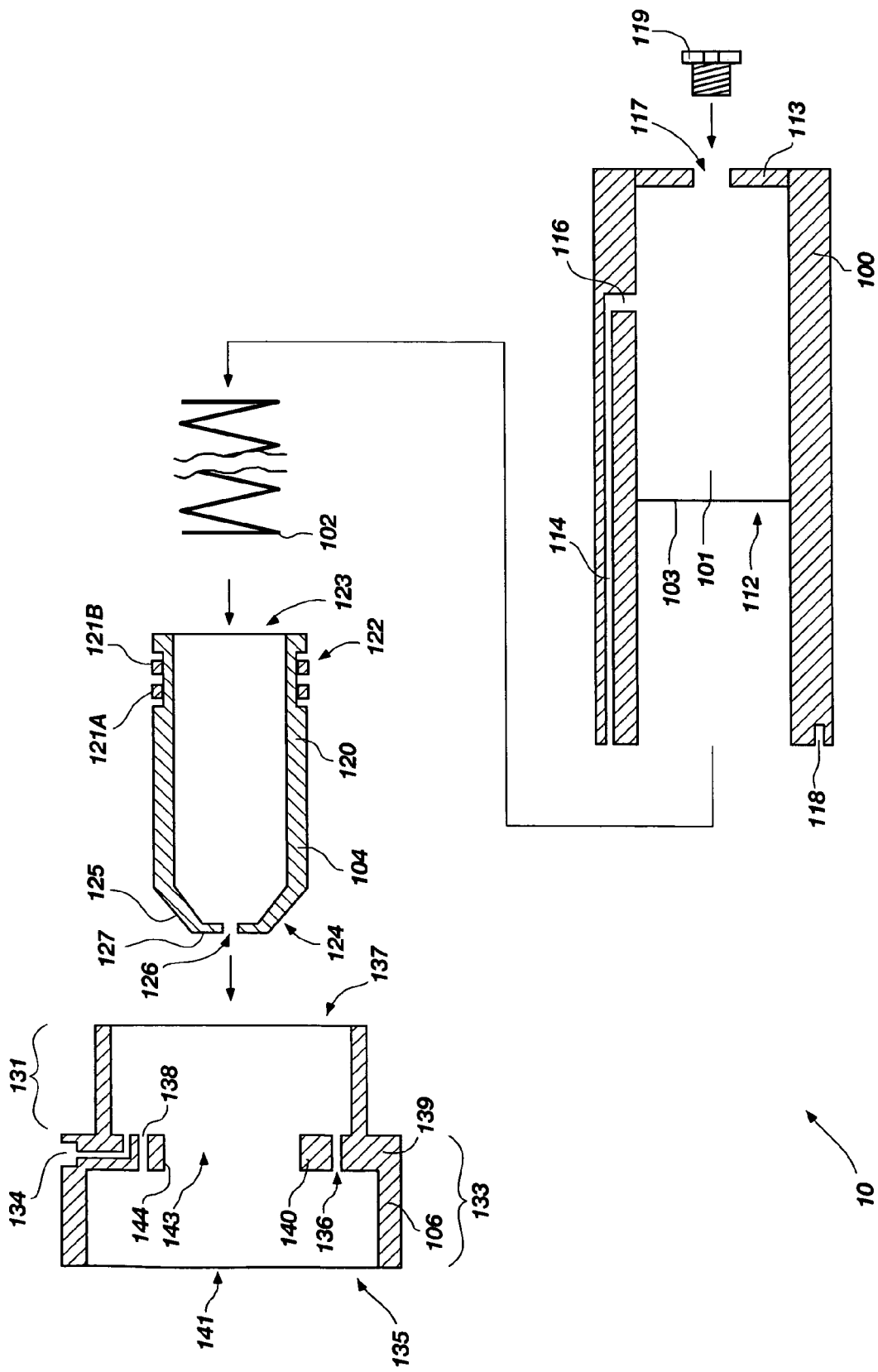
FIG. 3 is an exploded sectional side view of the inlet valve assembly of FIGS. 1 and 2.

FIGS. 2 and 3 depict an inlet valve assembly 10. Beginning at the proximal end, inlet valve assembly 10 includes an inlet head 106, a piston 104, a spring 102, and a receiver 100. Receiver 100 includes a sidewall 101, which defines a hollow cylinder 112 extending from a rear wall 113 to front edge 103. Disposed on the outer surface of sidewall 101 are at least two attachment legs 110. Each attachment leg 110 extends down the entire length of the sidewall 101, and the sidewalls thereof define flow channels C along the outer surface of the sidewall 101. The proximal ends of the attachment legs 110 extend past front edge 103 to flat attachment surfaces. Each attachment leg 110 includes an attachment structure, such as a threaded hole 118 in its flat attachment surface, which allows the leg to be attached to the inlet head 106. Gaps are formed between the proximal lengths of the attachment legs 110 and correspond to the flow channels C.

At least one of the attachment legs 110 may further include a passage 114, which extends distally from a proximal end thereof. A second opening 116 disposed in the inner surface of sidewall 101 communicates with passage 114. Additionally, an opening 117 may be placed in rear wall 113 and may be closed by a plug 119 or utilized, as discussed further herein.

Piston 104 is defined as a hollow cylinder having a sidewall 120 and an open rear end 123. A notch 122 may be formed in the outer surface of sidewall 120 around the cylinder at a desired distance from the rear end, as depicted ion FIG. 2. As depicted in FIG. 3, in some embodiments of notch 122 may have a relatively wider span and one or more rings placed therein to form a seal against the sides of receiver 100 Such rings may be formed from a resilient and durable material, such as DELRIN® resin available from E. I. du Pont de Nemours and Company or Ertalyte® available from Quadrant Engineering Plastic Products. In the depicted embodiment, the rings 121A and 121B may be formed as split rings having a split allowing them to be placed over piston 104. For such an installation, the rings 123A and 123B may be placed such that the splits are disposed on opposite sides of piston 104.

The front surface 124 of the piston 104 includes a central planar portion 127 surrounded by a slanted or beveled edge 125, which extends down to the sidewall 120. A bleed hole 126 is disposed in the central planar portion 127.

A threaded plug 119 may be inserted in the opening 117 of the receiver 100, closing rear wall 113. A spring 102 in contact with rear wall 113 extends into the open bottom 123 of piston 104, which resides between the proximal ends of attachment legs 110, to the rear of inlet head 106.

Inlet head 106 is defined by a sidewall 139 generally forming a cylinder with a front end 135 and a rear end 137, each of which are open to a central passage 141. A front portion 133, remains outside a tank T on installation in a sidewall thereof and has a larger diameter than the rear portion 131. The outer surface of the sidewall 139 in front portion 133 may have planar areas or other tool prints in order to allow placement of the inlet head 106 by a tool (not shown). Also located on the exterior surface of the front portion 133 may be an opening for a passage 134. The interior surface of the side wall 139 in the front portion 133 may be threaded or include other structures for making releasable attachment to a fuel nozzle.

The rear portion 131 of inlet head 106 may have a smaller exterior diameter than the front portion 133. The exterior surface of the rear portion 131 may be threaded 132 to allow for installation in the sidewall of a fuel tank.

A central plate 140 is disposed in the central passage 141, attached to the interior surface of sidewall 139. Central plate 140 may separate front portion 133 from rear portion 131. Central plate 140 includes a central aperture 143 that allows central passage 141 to continue therethrough. The edge of the central aperture 143 is defined by an edge 144, which is preferably formed as a curved flat surface transverse to the central plate 140 and parallel to sidewall 139.

Also disposed in central plate 140 are attachment structures, such as the bolt holes 136, which align to the threaded holes 118 in the attachment legs 110, allowing the inlet head 106 to be attached to receiver 100. The rear surface 142 of central plate 140 also contains an opening 138 which connects to passage 134.

Figure 4:
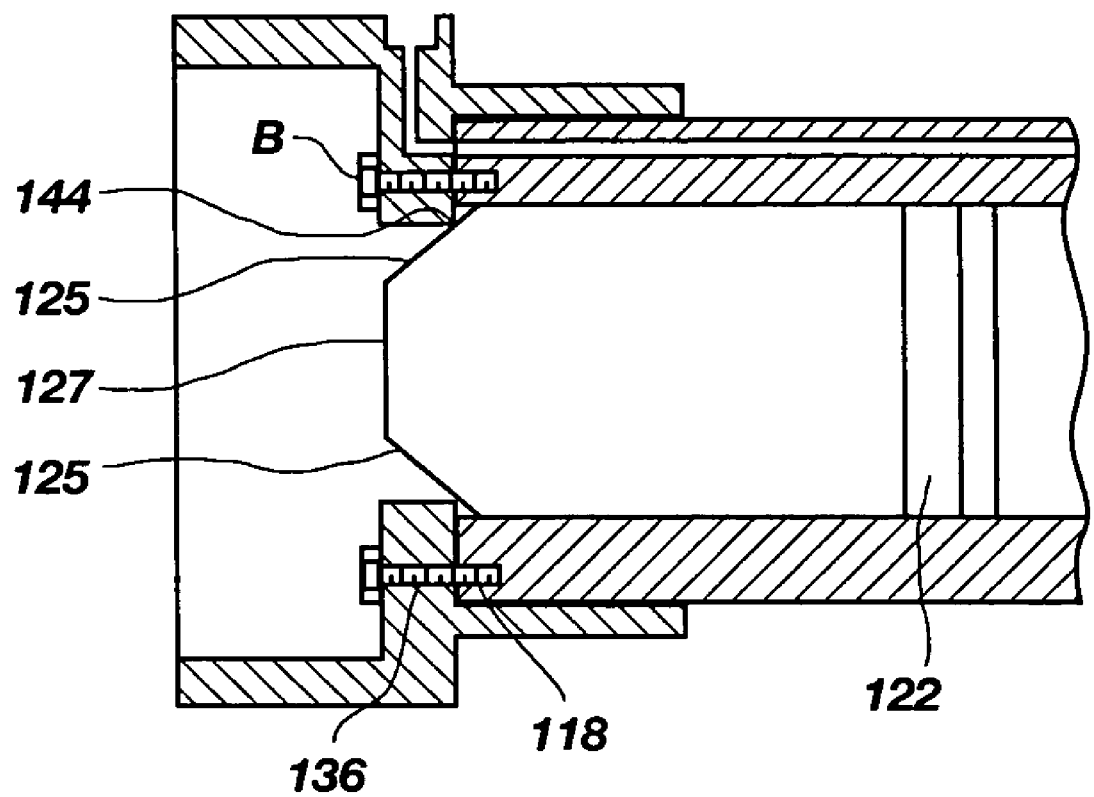
FIG. 4 is a sectional side view of a portion of the inlet valve assembly of FIGS. 1-3.

FIG. 4 depicts a sectional side view of a portion of the inlet valve assembly of FIGS. 2 and 3. Inlet head 106 is secured to receiver 100 by the insertion of bolts B through the bolt holes 136 and into threaded holes 118. Opening 138 aligns with the front opening for passage 114, forming a continuous passage from opening 116 in the receiver 100 chamber to the opening for passage 134 in the exterior surface of the inlet head 106.

Spring 102 pushes piston 104 in a proximal direction, such that the slanted or beveled edge 125 of the front surface 124 of piston 104 contacts the edge 144 defining central aperture 143 in central plate 140, thereby closing central passage 141.

Figure 5:
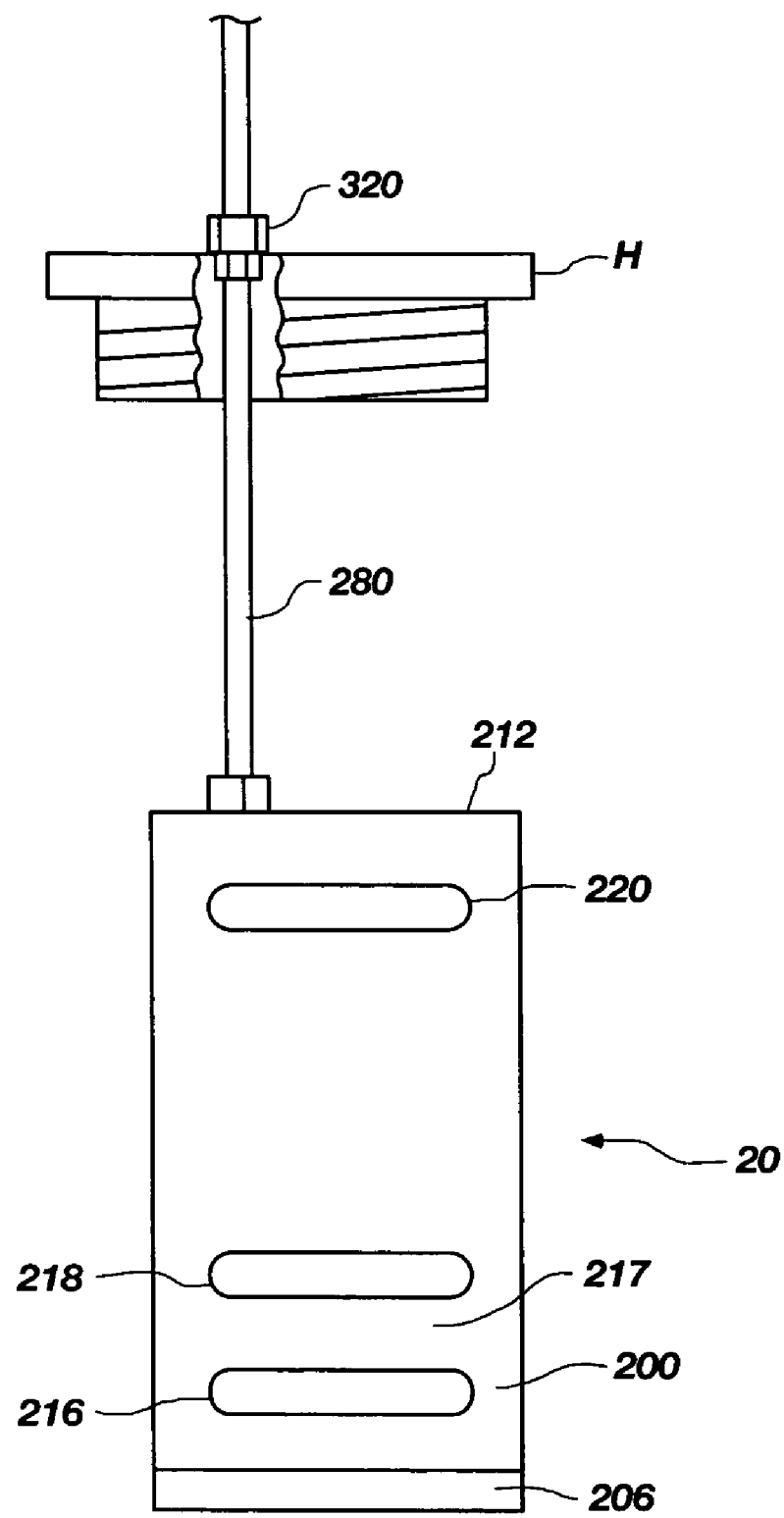
FIG. 5 is a side view of the float valve assembly and mounting head of FIG. 1.
Figure 6:
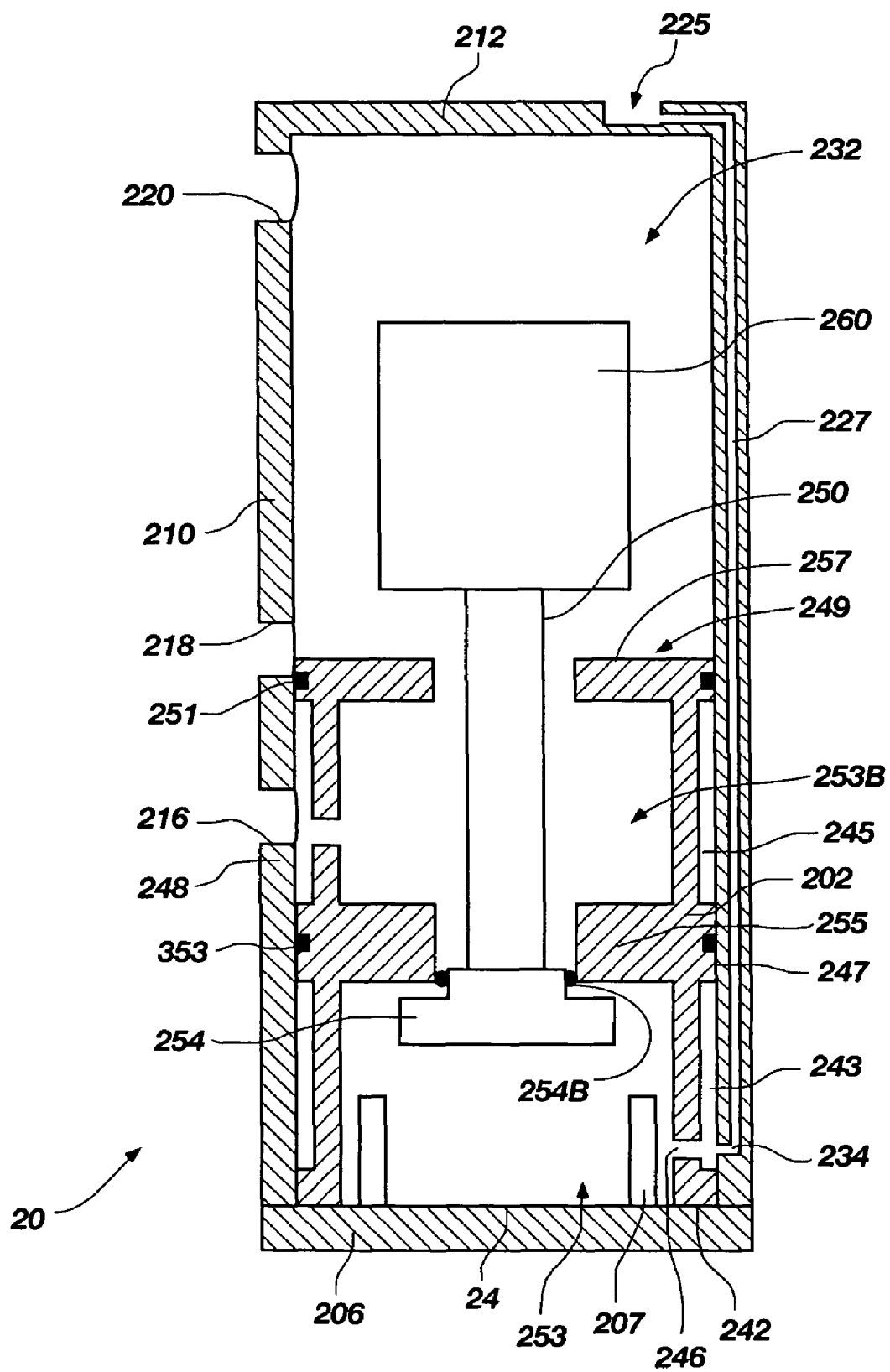
FIG. 6 is sectional side view of the float valve assembly of FIGS. 1 and 5.

Turning to FIGS. 5 and 6, a vertical float valve assembly 20 for a flow control valve system in accordance with the principles of the present invention is depicted. A valve case 200 has an open bottom end in which a float valve assembly 202 may be loaded, and a float valve bottom cap 206 may be used to secure the float valve assembly within the valve case 200.

Float valve case 200 may be formed as a hollow cylinder defined by an elongated circular sidewall 210, having a closed top end 212 and an open bottom end 214 allowing access to a central chamber 232. An access hole 225 in the exterior surface of top end 212 connects with a passage 227 which passes downwards in the sidewall 210 to opening 234 in the central chamber 232. Bottom end 214 may contain attachment structures, such as threaded holes for attachment to the bottom cap 206.

The sidewall 210 of valve case 200 contains a series of openings that may be formed as elongated slots. The lower opening 216 is located closest the bottom end 214, with medial opening 218 disposed a small distance above. A section of sidewall 210 separates lower opening 216 and medial opening 218 as a dividing structure 217. Lower opening 216 is disposed at a point along the length of valve case 200 above the opening 234 in the central chamber 232. An upper opening 220 is positioned further up the valve body nearer the top end 212. Although the depicted embodiment shows one set of openings 216, 218 and 220, it will be appreciated that any number of sets, such as 1, 2, 3, or 4 different openings at each level may be used.

A valve assembly 202 includes a valve body 249 formed as a sidewall defining a cylinder with a bottom end 242 opening onto a chamber 253, and closed top end 257. A medial wall 255 is disposed at the upper end of chamber 253, forming an upper chamber 253B between medial wall 255 and closed top end 257.

The top end 257 includes a central aperture, which passes therethrough to upper chamber 253B. Medial wall 255 also includes a central aperture aligned therewith, which exits into chamber 253. Bottom end 242 may contain attachment structures, such as threaded holes 243 for attachment to the bottom cap 206.

The outer surface of valve body 249 includes a lower groove 243 and an upper groove 245 formed in the sidewall, the grooves being separated by bridge 247, a wider section of the sidewall having a larger diameter (similar to the inner diameter of chamber 253), which is similar to the diameter of the lower portion of the valve body 249 below lower groove 243. An upper o-ring 353 is disposed in bridge 247 and a lower o-ring 251 is disposed below the lower groove 243.

A lower passage 246 is formed as a hole in the sidewall of valve body 249 disposed in lower groove 243 and allows access therethrough to chamber 253. An upper passage 248 is formed as a hole in the sidewall of valve body 249 disposed in upper groove 245 and allows access therethrough to upper chamber 253B.

A shaft 250 may be placed in the chamber 253 and upper chamber 253B, extending through the central apertures in medial wall 255 and closed top end 257. Shaft 250 may have a smaller diameter than the central apertures, in order to allow it to slidably move therein. A float 260, which may be formed from any suitable material having a density less than the liquid to be placed in the tank, may be attached to the upper end of shaft 250, above closed top end 257.

At the lower end of shaft 250, a stopper 254 is disposed. Stopper 254 may be an enlarged end of the shaft, or may be an attached structure. The stopper 254 has a diameter larger than the central aperture in the medial wall 255, sufficient to abut the medial wall and prevent fluid flow through the central aperture. An o-ring 254B or other sealing mechanism may be placed thereon.

Bottom cap 206 may be formed as a planar disc having a diameter similar to that of valve case 200. Attachment structures, such as threaded screw holes may be provided to allow the cap to be attached to the valve case 200 and to secure valve body 249 in position upon assembly. Where desired, a central aperture may be present, which can be closed by a plug. Such a central aperture may aid in assembly and disassembly of the float valve 20.

As best depicted in FIG. 6, upon assembly, valve assembly 202 is inserted in the open bottom of valve case 200. The bottom cap 206 is attached to float valve case 200 and float valve assembly body 249. The bottom end of chamber 253 is thereby sealed to form an enclosed space, with lower channel 243 being aligned with opening 234. Bridge 247 is disposed just below lower opening 216 and upper o-ring 353 and lower o-ring 251 effectively seal against the inside surface of the valve body, isolating lower channel 243.

In some embodiments, a diffuser, 207 may be disposed in the chamber 253 in front of lower passage 246 to diffuse a stream of incoming fluid entering chamber 253 through the opening 234 and lower passage 246. Diffuser 207 may be formed as a wall disposed on bottom cap 206, such as a circular ring formed thereon. In use, applicants have found that the diffuser may prevent premature closing of the valve assembly 10, by preventing the force of a fluid stream from pushing stopper 254 in an upwards direction.

Mounting head H may be mounted in the wall of a tank (as at an upper wall or sidewall) and the height of the float valve assembly 20 may be adjusted thereto by selecting or manipulating the length of the tubing 280 and securing at the mounting head H, as depicted in FIGS. 1 and 5. This may occur through the use of a clamp 320, such as a threaded tube clamp, disposed at a passage on the mounting head H through which tubing 280 passes, to releasably retain the tubing 280 at a desired position. Releasing clamp 320 allows the length of tubing 280 between the mounting head H and float valve 20 to be adjusted by repositioning the tubing and securing clamp 320 at a desired position. It will be appreciated that in embodiments where tubing 280 runs internally to tank T, a metal rod or secondary piece of tubing may be used to create an adjustable connection between mounting head H and float valve 20. Since the height of an installed float valve 20 can be adjusted by altering the position with respect to mounting head H, as by manipulating tubing 280, this allows the ullage within a tank to be adjusted. Thus, the headroom within the tank for the expansion and contraction of fluid due to environmental factors can be adjusted for a single installation.

Upon installation in a tank, the float valve portion 20 is placed at a desired height and tubing 280 may be attached in access hole 225, thereby communicating with passage 227. Inlet valve portion 10 may then be emplaced in a sidewall of the tank, on a fuel pipe leading into the tank, or may be used to replace a previous inlet valve attached to the tank. Float valve access hole 225 is placed in fluid communication with inlet valve 10, using tubing 280. Where tubing 280 runs outside the tank, attachment to the inlet valve portion 10 may be made to the opening for passage 134. Where tubing 280 runs inside the tank, attachment to the inlet valve portion 10 may be made to the opening 117 in rear wall 113. Depending on the equipment on which the tank is located, it may be preferable to place the tubing inside or outside, in order to allow retrofitting or to avoid snaring during operation.

When a filling nozzle is connected to the inlet head 106, fluid is pumped under pressure therein, the fluid pressure on the upstream face of the piston 104 moves the piston, against spring 102 and away from the central plate 140. As the slanted portion 125 of the front edge 124 of piston 104 moves away from edge 144, fluid flows directly therethrough and down channels C into the tank. The direct flow of the fuel down the channels minimizes turbulence in the tank during filling.

A portion of the fluid passes through the bleed hole 126 and flows therethrough into tubing 280, passing either through rear opening 117 or through the opening 116, to the float valve portion 20 and therethrough to the tank, when the fluid level is low enough that the float valve remains open.

When the fluid level rises to a sufficient level, fluid enters the medial and upper elongated slots 218 and 220 and float 260 rises. Shaft 250 is pulled upwards to engage stopper 254 against medial wall 255, closing the central aperture therein. Fluid flow through tube 280 is then prevented. The pressures on both sides of the piston 104 begin to equalize and spring 102 pushes the piston back such that the front surface 124 engages the central plate 140, preventing any further fluid flow therethrough.

Another advantage of the systems in accordance with the present invention, is that a female quick-connect receiver can be installed within the inlet head to receive a quick-connect nozzle for pressurized rapid filling. Traditionally, if the quick-connect closure is jammed open, as by debris, the tank can rapidly empty through the fuel nozzle. With a system in accordance with the present invention installed, the face of the piston will seal against the plate in the inlet head, preventing fluid from emptying out of the tank.

While this invention has been described in certain embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A valve system for controlling the flow of fluid into a tank, comprising:

a remote fluid level sensor in the tank;

an inlet head comprising a planar face having a fluid passage therethrough;

a receiver attached to the inlet head, the receiver comprising a tube having a closed rear wall and an open front, the tube spaced a distance from the planar face of the inlet head, and multiple connection members attached to the tube and the inlet head, the multiple connection members defining gaps therebetween in the space between the open front of the tube and the inlet head and each of the multiple connection members extending down an outer surface of the tube as a raised wall to thereby define channels along the outer surface of the tube corresponding with the gaps;

a resilient member disposed at least partially in the tube of the receiver;

a piston having a front surface and a sidewall, with at least one bleed port passing through the front surface, which may be urged by the resilient member to a first position with the front surface sealed against a rear surface of the planar face of the inlet head and may be moved to a second position retracted against the spring into the tube of the receiver opening the fluid passage by a fluid pressure upon the front surface; and a bleed passage outlet in the tube of the receiver distal to the piston, the bleed passage outlet connectable to the remote fluid level sensor in the tank; so arranged that during use when the remote fluid level sensor senses that a fluid level in the tank is below a pre-set level, a portion of fluid from a fluid pressure flow against the front surface of the piston enters through the at least one bleed port in the piston and through the bleed passage outlet to the remote fluid level sensor, to enable a fluid pressure difference between the inlet head and the tank to move the piston to the second position, allowing the fluid pressure flow to flow through the fluid passage and into the tank; but when the fluid level sensor senses that the fluid level has reached or exceeded the preset level, the fluid level sensor shuts off the fluid flow through the bleed passage to equalize the pressure on both ends of the piston, and the resilient member urges the piston to the first position to shut off the flow of fluid, closing the fluid passage by bringing the front surface of the piston against the planar face of the inlet head.

2. The valve system of claim 1, wherein the resilient member comprises a coil spring.

3. The valve system of claim 1, wherein the inlet head further comprises at least one structure for connecting to a fuel dispensing nozzle.

4. The valve system of claim 1, wherein the multiple connection members attached to the tube and the inlet head comprise multiple attachment legs extending from the tube to the inlet head.

5. The valve system of claim 4, wherein at least one attachment leg of the multiple attachment legs comprises a bleed passage in fluid communication with the bleed passage outlet and the inlet head further comprises a bleed passage inlet in fluid communication with the bleed passage.

6. The valve system of claim 1, wherein the bleed passage outlet comprises an opening in the rear wall of the receiver tube.

7. The valve system of claim 1, wherein the front surface of the piston comprises a central planar portion surrounded by a slanted edge connected to the sidewall of the piston.

8. The valve system of claim 7, where when the piston is urged by the resilient member to the first position with the front surface sealed against the rear surface of the planar face of the inlet head, the slanted edge of the front surface of the piston contacts the rear surface of the planar face of the inlet head.

9. The valve system of claim 1, wherein a notch is disposed around an outer surface of the sidewall of the piston and at least one sealing ring is disposed in the notch to contact an inner surface of the receiver.

10. The valve system of claim 1, wherein the remote fluid sensor in the tank comprises a float valve including a float and a valve which seals when a predetermined fluid level is reached.

11. The valve system of claim 10, wherein the bleed passage outlet in the tube of the receiver distal to the piston is connected to the remote fluid level sensor by a bleed line contained inside the tank.

12. The valve system of claim 10, wherein the float valve comprises an outer case and an inner float assembly, wherein the inner float assembly comprises an upper chamber and lower chamber disposed in the outer case which are separated by a medial wall with an aperture passing therethrough and shaft with a stopper disposed on the lower end thereof in the lower chamber extending through the aperture to a float in the upper chamber, such that the rising of the float engages the stopper against the medial wall closing the aperture and sealing the lower chamber.

13. The valve system of claim 12, wherein the outer case is connected to a length of tubing running to a mounting head placed in a wall of the tank, the length of tubing releasably attachable to the mounting head, such that the height of the float valve may be adjusted by releasing the attached length of tubing and reattaching the length of tubing at a different point, thereby altering the ullage of the tank.

14. An inlet valve for controlling the flow of fluid into a tank, comprising:

an inlet head comprising a planar face having a fluid passage therethrough;

a receiver attached to the inlet head, the receiver comprising a tube having a closed rear wall and an open front, the tube spaced a distance from the planar face of the inlet head and multiple connection members attached to the tube and the inlet head, the multiple connection members defining gaps therebetween in the space between the open front of the tube and the inlet head and each of the multiple connection members extending down an outer surface of the tube as a raised wall to thereby define channels along the outer surface of the tube corresponding with the gaps;

a resilient member disposed at least partially in the tube of the receiver;

a piston having a front surface and a sidewall, with at least one bleed port passing through the front surface, which may be urged by the resilient member to a first position with the front surface sealed against a rear surface of the planar face of the inlet head and may be moved to a second position retracted against the spring into the tube of the receiver opening the fluid passage by a fluid pressure upon the front surface; and a bleed passage outlet in the tube of the receiver distal to the piston, the bleed passage outlet connectable to a remote fluid level sensor in the tank; so arranged that during use when the remote fluid level sensor senses that a fluid level in the tank is below a pre-set level, a portion of fluid from a fluid pressure flow against the front surface of the piston enters through the at least one bleed port in the piston and through the bleed passage outlet to the remote fluid level sensor, to enable a fluid pressure difference between the inlet head and the tank to move the piston to the second position, allowing the fluid pressure flow to flow through the fluid passage and into the tank; but when the fluid level sensor senses that the fluid level has reached or exceeded the preset level, the fluid level sensor shuts off the fluid flow through the bleed passage to equalize the pressure on both ends of the piston, and the resilient member urges the piston to the first position to shut off the flow of fluid, closing the fluid passage by bringing the front surface of the piston against the planar face of the inlet head.

15. The inlet valve of claim 14, wherein the resilient member comprises a coil spring.

16. The inlet valve of claim 14, wherein the inlet head further comprises at least one structure for connecting to a fuel dispensing nozzle.

17. The inlet valve of claim 14, wherein the multiple connection members attached to the tube and the inlet head comprise multiple attachment legs extending from the tube to the inlet head.

18. The inlet valve of claim 17, wherein at least one attachment leg of the multiple attachment legs comprises a bleed passage in fluid communication with the bleed passage outlet and the inlet head further comprises a bleed passage inlet in fluid communication with the bleed passage.

19. The inlet valve of claim 14, wherein the bleed passage outlet comprises an opening in the rear wall of the receiver tube.

20. The inlet valve of claim 14, wherein the front surface of the piston comprises a central planar portion surrounded by a slanted edge connected to the sidewall of the piston.

21. The inlet valve of claim 20, where when the piston is urged by the resilient member to the first position with the front surface sealed against the rear surface of the planar face of the inlet head, the slanted edge of the front surface of the piston contacts the rear surface of the planar face of the inlet head.

22. The inlet valve of claim 14, wherein a notch is disposed around an outer surface of the sidewall of the piston and at least one sealing ring is disposed in the notch to contact an inner surface of the receiver.

\* \* \* \* \*